United States Patent [19]
Delatorre

[11] Patent Number: 5,431,065
[45] Date of Patent: Jul. 11, 1995

[54] MULTIPLE CAPACITOR TRANSDUCER

[75] Inventor: Leroy C. Delatorre, Sugar Land, Tex.

[73] Assignee: Panex Corporation, Sugar Land, Tex.

[21] Appl. No.: 220,515

[22] Filed: Mar. 31, 1994

[51] Int. Cl.[6] .................................................. G01L 3/00
[52] U.S. Cl. ............................ 73/862.626; 73/862.621
[58] Field of Search .................... 73/724, 742, 862.626, 73/862.636, 862.337

[56] References Cited

U.S. PATENT DOCUMENTS

| 4,691,574 | 9/1987 | Delatorre | 73/708 |
|---|---|---|---|
| 5,168,419 | 12/1992 | Delatorre | 73/733 |
| 5,207,767 | 5/1993 | Delatorre | 73/733 |

Primary Examiner—Richard L. Chilcot, Jr.
Assistant Examiner—R. L. Biegel
Attorney, Agent, or Firm—Donald H. Fidler

[57] ABSTRACT

A capacitor device for utilizing dependent capacitances for measurement purposes wherein facing surfaces have pairs of capacitors constructed and arranged relative to a displacement axis so that a first pair of capacitors define measurement capcitors and a second pair of capacitors define reference capacitors and capacitance measurements from the capacitors can be combined to minimize effects of relative displacement in the facing surfaces.

18 Claims, 5 Drawing Sheets

FIG. 3

MULTIPLE CAPACITOR TRANSDUCER

RELATED APPLICATIONS

This is application is related to U.S. Pat. No. 5,207,767, issued May 4, 1993 which is entitled "CAPACITOR AND PRESSURE TRANSDUCER".

FIELD OF THE INVENTION

This invention relates to pressure and torque transducers and more particularly to a pressure transducer using relatively small capacitors and utilizing micro displacements for use in high pressure transducers requiring a wide pressure range of operations under changing temperature conditions and for producing pressure measurements with a high degree of accuracy.

BACKGROUND OF THE INVENTION

While the present invention finds particular usefulness in the oil industry, it has particular application in other hostile pressure and temperature environments where size of the transducer and accuracy of the measurements are important. In an oil well pressure transducer, it is common to size a unit to go into a small diameter metal pressure housing for measurement of pressures up to 20,000 psi and even more and which can be subjected to downhole temperatures up to 400° F. or more. The pressure housing must have a wall thickness sufficient to withstand the downhole pressures so that the O.D. of the internal pressure transducer is in the neighborhood of one inch. In addition to pressure and temperatures, the unit is subjected to rough treatment.

A downhole oil well pressure gauge can be transported by a wireline, cable or pipe string to one or more levels of interest in a well bore where both temperature and pressure are sensed over a period of time. Typically, pressure measurements are repeatedly sampled and recorded over a period of time at a sampling rate determined by down hole electronics and may be stored in a downhole memory for subsequent replay or sent to the surface for analysis. Alternately, sometimes gauges are attached to production strings or other downhole equipment for extended periods of time or "permanently".

In U.S. Pat. No. 5,207,767 and elsewhere, a capacitance type pressure transducer utilizes spaced apart capacitor plates on spaced apart base members to define two capacitances which dependently vary as one of the base members is torqued about a torque axis relative to the other base member. In some instances, various factors can cause the base members to be displaced relative to one another and produce potentially inaccurate measurements. The present invention provides a system for compensation of unintended shifting or displacement of base members relative to one another.

SUMMARY OF THE INVENTION

In the present invention, four capacitors are defined by spaced apart capacitor plates respectively located on spaced apart capacitor base members. The capacitor base members are vertically arranged in a housing. The capacitor plates for each capacitor are disposed at equally offset locations relative to a central vertical axis for the device so that two capacitors are located on either side of the vertical axis. One of the capacitor base members has a movable section which can be angularly torqued or displaced about a vertical torque axis by an applied torque force to dependently vary the respective capacitance of two of the capacitors, herein referred to as "measurement capacitors". The angular torque is obtained by a spirally wound bourdon tube which, when subjected to internal fluid pressure, produces a torque about the torque axis. The torque axis is centrally located in the angularly displaceable capacitor base member. The other two capacitors are fixed spacially with respect to one another on the base members and are herein referred to as "reference capacitors".

By arranging the capacitor base members of the measurement capacitors so that related capacitance between capacitor plates on the base member are varied as a function of an angular relationship of the capacitor plates relative to a mid-plane, a high capacitance sensitivity can be obtained with low angular torque deflection. That is, a micro dimensional change in the capacitor gap produces a defined measurement parameter. The high sensitivity is obtained by measurement of a small displacement of the capacitor plates at a significant distance from the center of angular displacement (the displacement axis). By using the reference capacitors, a relationship is created wherein the capacitance measurements can be combined to minimize the effects of any extraneous relative displacement of the base members.

DESCRIPTION OF THE PRESENT INVENTION

Figure 1:
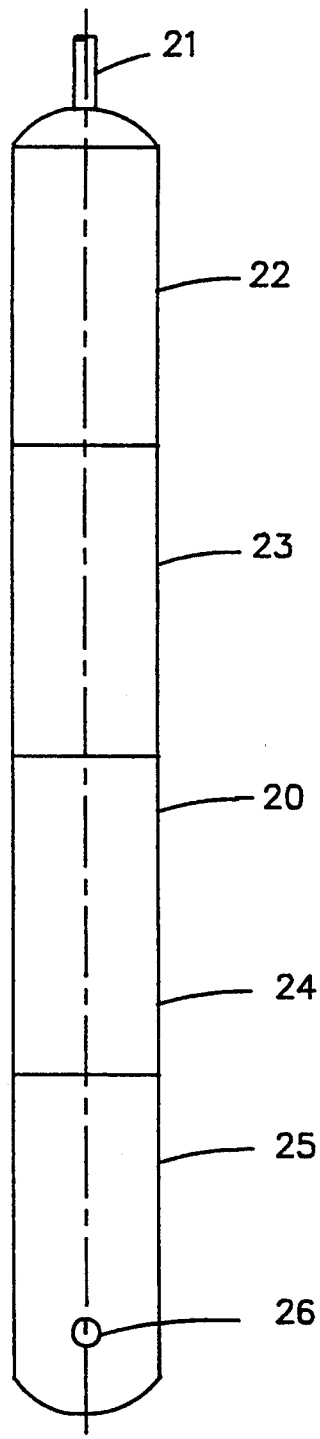
FIG. 1 is a schematic illustration of a well tool in which the present invention can be embodied.

By way of background, as shown in FIG. 1, downhole cylindrically shaped well tool 20 is sized for insertion through a small diameter well tubing and adapted for coupling to the end of a wireline cable 21. The cable 21 extends to a surface located spooling reel or drum (not shown). The tool 20 generally includes a DC battery pack section 22 as a source of electrical power, an electronic section 23 with electronic circuitry for providing electrical power and electronic processing, a temperature sensor section 24 with a temperature probe for sensing temperature; and a pressure sensor section 25 with a pressure transducer for sensing pressure. An opening 26 admits fluid under pressure to the pressure sensor or the transducer in the sensor section 25. For further reference to this type of tool, see U.S. Pat. No. 4,763,259.

Figure 2:
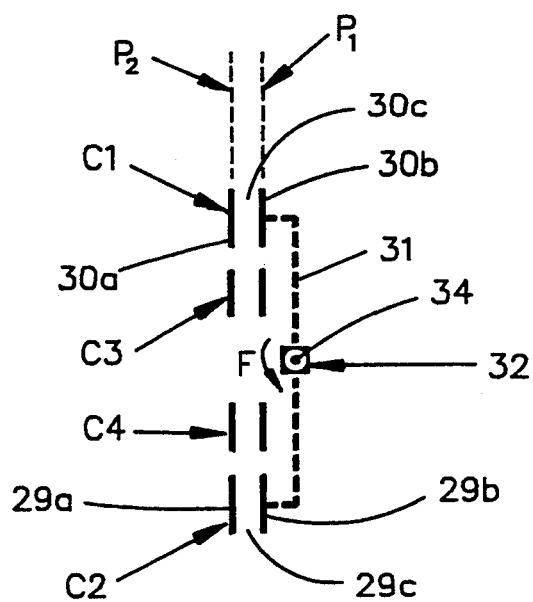
FIG. 2 is a schematic view of a functional relationship of the capacitors embodied in the present invention.

Referring now to FIG. 2, the operating concept of the capacitor arrangement of the present invention is schematically illustrated for descriptive purposes. In FIG. 2, separate electrical capacitors $C_1$, $C_2$ are illustrated where the capacitor $C_2$ has parallel capacitor plates 29a, 29b which are separated by a capacitance gap 29c. The capacitor $C_1$ is a measurement capacitor which has parallel capacitor plates 30a, 30b where the plates 30a, 30b are separated by a capacitance gap 30c. The plates 29a, 30a are fixed and on a base member in a common plane $P_1$ (see dashed line) which is transverse to the plane of the drawing. The other plates 29b, 30b are on a base member in a common plane $P_2$ which is parallel to the plane $P_1$ in a zero position of the base members. The plates 29b, 30b are attached (see dashed line 31) to a torsion beam means 32. The beam means 32 has a torque axis 34 in a transverse plane to the plane of the drawing and the beam means 32 can be torqued about its torque axis 34 to deflect the plates 29b and 30b angularly about the torque axis 34 and dependently alter the capacitance of the capacitors $C_1$ and $C_2$. The torque is produced by a torque force "F" acting on the beam means 32.

The system also has a pair of reference capacitors $C_3$ and $C_4$ which are respectively on the supporting base members but are arranged so that the plates of the capacitances $C_3$ and $C_4$ are fixed in position on the respective base members and are not subject to torque forces or other forces which act equally upon both base members.

Figure 3:
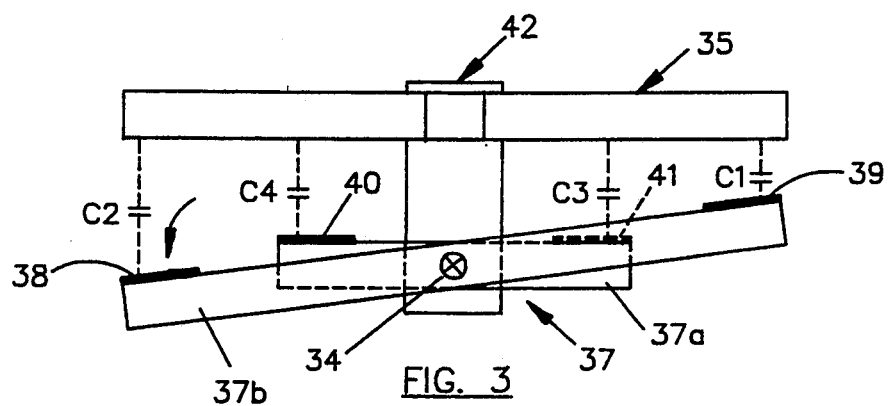
FIG. 3 is a more detailed schematic illustration of the capacitors embodied in the present invention.
Figure 9:
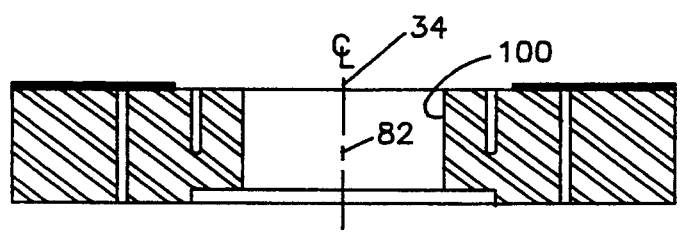
FIG. 9 is a view along line 9—9 of FIG. 8.

The foregoing arrangement is better illustrated schematically in somewhat greater detail in FIG. 3. From a top view, a first base member 35 is common to the one plate of each of the capacitors $C_1$, $C_2$, $C_3$, and $C_4$ (The capacitors are schematically illustrated). A second base member 37 is comprised of independent base sections 37a and 37b. At a zero or null position (no applied torque) of the base members 35 & 37, the capacitor plates 38 & 39 of the capacitors $C_1$ and $C_2$ on the section 37a of the base member 37 are parallel to one another and there is an equal gap spacing between the capacitor plates. The capacitor plates 40 & 41 of the capacitors $C_3$ and $C_4$ are parallel to one another in a zero position and there is an equal gap spacing between these capacitor plates. The base section 37b of the base member 37 can be torqued about the transverse torque axis 34 to dependently vary the capacitance measurements of capacitors $C_1$ and $C_2$. The base section 37a of the base member 37 is fixed to the base member 35 by a mounting means 42 so that the capacitors $C_3$, & $C_4$, have an equal gap spacing between their capacitor plates and are fixed relative to one another.

Figure 4:
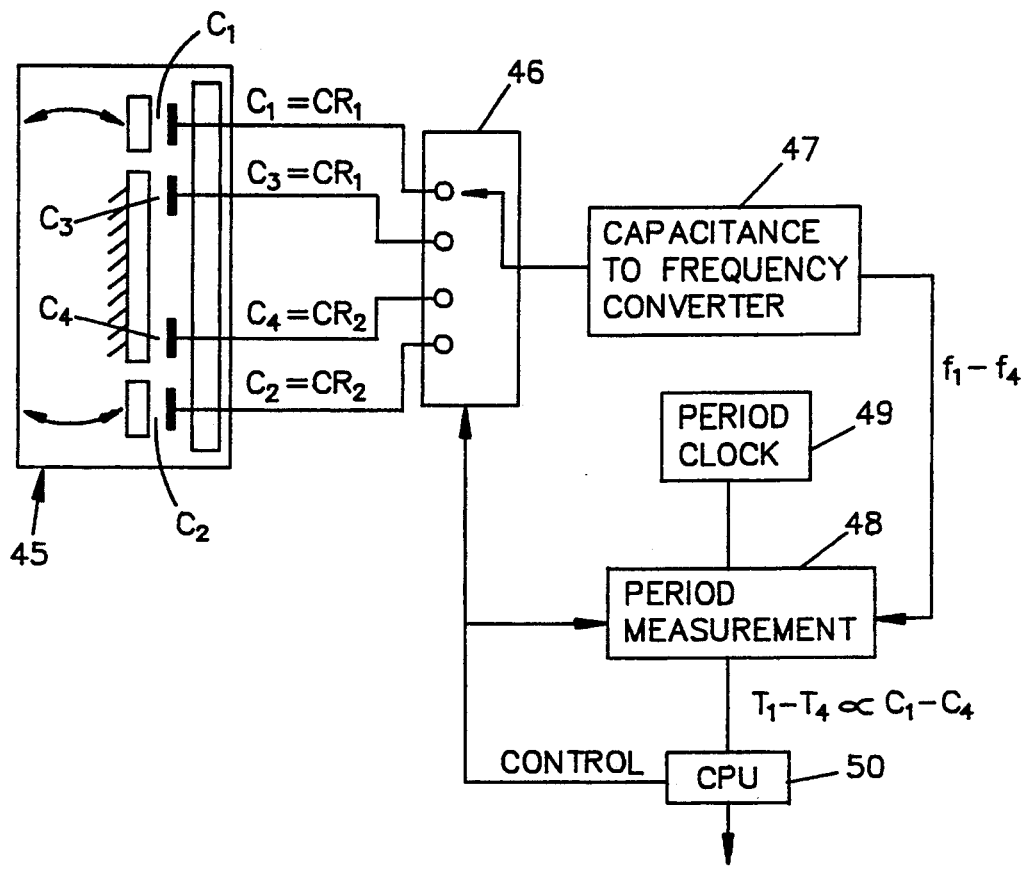
FIG. 4 is a schematic illustration of an electronic system for processing capacitor signals representative of a pressure measurement.

Referring now to FIG. 4, a transducer 45 has individual capacitors $C_1$, $C_2$, $C_3$, and $C_4$ for developing a capacitance measurements, $CM_1$, $CM_2$, where capacitor $C_1$ and $C_2$ are measurement capacitors. The capacitors $C_3$ and $C_4$ are reference capacitors for developing reference capacitance measurements $CR_1$ & $CR_2$, respectively for the reference capacitors $C_3$ and $C_4$. The capacitance measurement and the reference signals are sequentially and respectively switched by a switch means 46 to a single channel capacitance to frequency converter 47. The single channel converter 47 is sequentially supplied with the capacitance measurements and develops corresponding frequency signals f1, f2, f3 and f4 from the capacitance measurements. The respective frequency signals are used to develop period measurement signals $T_1$, $T_2$, $T_3$, and $T_4$ in a period measurement circuit means 48 by use of a period clock 49. The measurement period means 48 and the switch means 46 are controlled by a CPU means 50. The CPU means 50 is programmed to process the capacitor measurements represented now by period signals to cancel out the effects of changes in the gap and/or deflection not due to measured torque. This is accomplished by combining the capacitance signals as will be explained hereafter.

Figure 5:
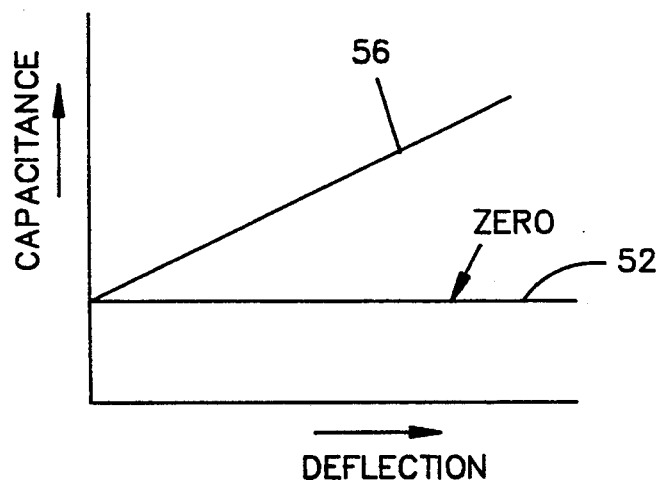
FIG. 5 is a schematic chart to illustrate the effect of displacement of base members relative to span and to gap of the capacitors.

With reference to FIG. 5, where there is no applied torque (from a pressure measurement), the CPU 50 outputs a processed signal derived from the combined capacitance measurements at a zero reference level 52 (no input measurement) because the base member 35 is parallel to the base section 37a (see FIG. 3). At the zero reference level it can be appreciated that an equal capacitance measurement relationship can exist, i.,e.:

$$C_1 = C_2 = K_A C_3 = K_A C_4 \qquad (1)$$

where $K_A$ is a coefficient to adjust for the area and position location of the capacitors.

Under normal operating conditions, when the base member 37 is torqued by a pressure for measurement, the capacitance relationship of $K_A C_3$ and $K_A C_4$ will remain constant and the capacitance relationship of $C_1$ and $C_2$ are dependently changed. The capacitance relationship of $C_1$ and $C_2$ as a function of an angular torque displacement $\alpha_{12}$ is proportional to:

$$\alpha_{12} \approx \frac{C_1 - C_2}{C_1 + C_2} \qquad (2)$$

where $\alpha_{12}$ is the angular torque displacement of base member 37b relative to the base member 35.

It can be appreciated that a relative angular deflection in either base members 37a or 35 will affect the capacitances $C_1$ and $C_2$. Therefore; this relationship can be expressed as:

$$\alpha_{12} = \alpha_{B1} - \alpha_{B2} \qquad (3)$$

where $\alpha_{B1}$ is the relative angular deflection of base member 37b to the base member 35 and $\alpha_{B2}$ is the relative angular deflection of base member 35 to the base mount 42. If relative angular displacement $\alpha_{B2}$ occurs without correction, an error can be introduced into the measurements.

Similarly, for the capacitances $C_3$ and $C_4$, the angular displacement $\alpha_{34}$ can be defined as the relationship of:

$$\alpha_{34} = K_A \frac{C_3 - C_4}{C_3 + C_4} \qquad (4)$$

If a relative angular deflection occurs in either base member 37a or 35, the combined effect on the capacitances $C_3$ and $C_4$ can be stated as:

$$\alpha_{34} = \alpha_{B3} - \alpha_{B2} \qquad (5)$$

Where $\alpha_{B3}$ is the angular deflection of base member 35 relative to the base mount 42.

Since the base section 37a is fixed to the mount 42, the term $\alpha_{B3}$ can reasonably be assumed to be zero and therefore:

$$\alpha_{34} = -\alpha_{B2} \qquad (6)$$

Also since $\alpha_{B1}$ is the only parameter of interest, equations, (2) thru (6) can be solved to eliminate the other variables and can be stated as follows:

$$\alpha_{B1} = \alpha_{12} + \alpha_{B2} = \alpha_{12} - \alpha_{34} \qquad (7)$$

and, in terms of capacitances;

$$\alpha_{B1} = \frac{C_1 - C_2}{C_1 + C_2} - K_A \frac{C_3 - C_4}{C_3 + C_4} \qquad (8)$$

Expression (8), then, can be used in the CPU 50 so that the capacitances $C_3$ and $C_4$ provide measurements to correct for any rotational or deflections of base member 35 relative to the base mount 42.

Another effect that can occur in addition to the above stated effect of relative angular deflection is for the common gap or spacing between the capacitors to change.

If the gap spacing changes, then the capacitance measurements of each of the capacitances is equally affected and the relationship set forth in equation (8) is affected as follows:

for an angular displacement $\alpha_{B1}$ of the base member 37b about the axis 34, the equation (8) will reduce to a relationship of a gap change in the gap spacing of "d" (for capacitors $C_1$, $C_2$, $C_3$, $C_4$) to an undeflected gap spacing "G" of the base members of:

$$\alpha_{B1} = \frac{d_{12}}{G} - \frac{d_{34}}{G} \qquad (9)$$

Since each term of equation (9) is divided by the common undeflected gap spacing, then a change in gap will inversely affect the reading $\alpha_{B1}$. Also, if the gap changes $d_{12}$ (for capacitors $C_1$ and $C_2$) and $d_{34}$ (for capacitors $C_3$ and $C_4$) are equal to zero (the zero or null position) there will be no effect on the $\alpha_{B1}$ displacement. Since the effect is zero at zero reading and a maximum at the full output reading the angular displacement represents a slope change which is illustrated by the line 58 in FIG. 8. The measurement between zero and full deflection is sometimes referred to as "span".

It can also be shown that the gap can be expressed as:

$$G = K_G \cdot \frac{C_3 + C_4}{2C_3C_4} \qquad (10)$$

where $K_G$ is a proportionality constant. Since both terms in expression (8) are divided by the undeflected gap spacing G in equation (9), the expression (8) can be corrected for the undeflected gap spacing G by multiplying by expression (10) and results in the relationship.

$$\alpha_{B1} = \left[\frac{C_1 - C_2}{C_1 + C_2} - K_A \cdot \frac{C_3 - C_4}{C_3 + C_4}\right] \frac{C_3 + C_4}{2C_3C_4} \cdot K_G \qquad (11)$$

Equation (11) is now a fully corrected statement where the $K_A$ term corrects for zero and the span is corrected by the $K_G$ term. The corrections can be combined or either correction can be independently used, as desired. Thus, the CPU 50 with software or a hardwire system can be used to provide a processed signal which is corrected to any relative deviation of the base member 37a to the base member 35.

It should be noted that equation (8) can be used for zero correction without introducing a dependence on the stability of the conversion factor $K_f$ in the capacitance to frequency converter. Thus, for each capacitance:

$$f = k_f C_N \qquad (12)$$

where f is frequency.

The conversion of equation (8) to frequencies becomes:

$$\alpha_{B1} = \frac{\frac{f_1}{K_G} - \frac{f_2}{K_f}}{\frac{f_1}{K_f} + \frac{f_2}{K_f}} - K_A \cdot \frac{\frac{f_3}{K_f} - \frac{f_4}{K_f}}{\frac{f_3}{K_f} + \frac{f_4}{K}} \qquad (13)$$

where f is a frequency footnoted with respect to the respective capacitor.

This relationship is independent of the factor $K_f$. If the gap correction term is used, however, the relationship becomes:

$$G = K_G K_f \frac{f_3 + f_4}{2f_3 f_4} \qquad (14)$$

which is dependent on $K_f$. This correction can be used in the CPU 50 when the converter 47 is more stable than the gap spacing.

In the summary of the foregoing explanation, the measurement capacitors $C_1$ and $C_2$ respond to torque about the torque axis 34. Capacitors $C_1$ and $C_2$ also react to angular deflection occurring in the base member 35 about the base member axis as well as responding to capacitance changes due to changes in the gap.

The capacitors $C_3$ and $C_4$ respond only to any torque occurring in the base member 35 about the base member axis as well as responding to changes in the gap or spacing.

The capacitors $C_3$ and $C_4$ are therefore used to correct the measurements of capacitors $C_1$ and $C_2$ due to movement of the base member 35.

In the present invention, the capacitors $C_3$ and $C_4$ are not affected by torque and are only affected by the base means 35 (see FIG. 3). Since all four capacitance plates and electrodes are in a co-planar relationship on the base member 35, any deflection of the base member 35 will affect all four capacitances. By using the information from the reference capacitors $C_3$ and $C_4$, the measurements of the capacitors $C_1$ and $C_2$ can be corrected for any deflection of the base member 35.

The use of the reference capacitors $C_3$ and $C_4$ allows for correction of errors due to an external effect for both changes in gap and rotative position. External effects to cause such changes can include shock and temperature effects. The system provides for auto-calibrating these errors out on an individual reading basis which drastically reduces or essentially eliminates these errors.

The location of the reference capacitors is chosen to be approximately concentric with the capacitors in the preferred embodiment. This assures that the various capacitors respond similarly to base member disturbances.

Referring now to FIGS. 6, 7, 8 and 9, a more detailed illustration is provided for the capacitor arrangement of the present invention. In the illustration in the drawings, the structure of a capacitance transducer, as illustrated, includes an elongated, cylindrically shaped central fastener rod 80 with a central longitudinal axis 82 which is shown in a horizontal position. The axis 82 is normal to the planes of the capacitor plates. The rod 80 is a part of a support means for base members couples a first vertical capacitor plate base member 35 to a fixed center section 86 (see FIGS. 6 and 8) in a second vertical capacitor plate base member 88. The first base member 35 is cylindrically shaped and is made of a material having inherently dimensionally stable characteristics under changing environmental conditions such as temperature and time aging. Quartz is a suitable material.

Figure 8:
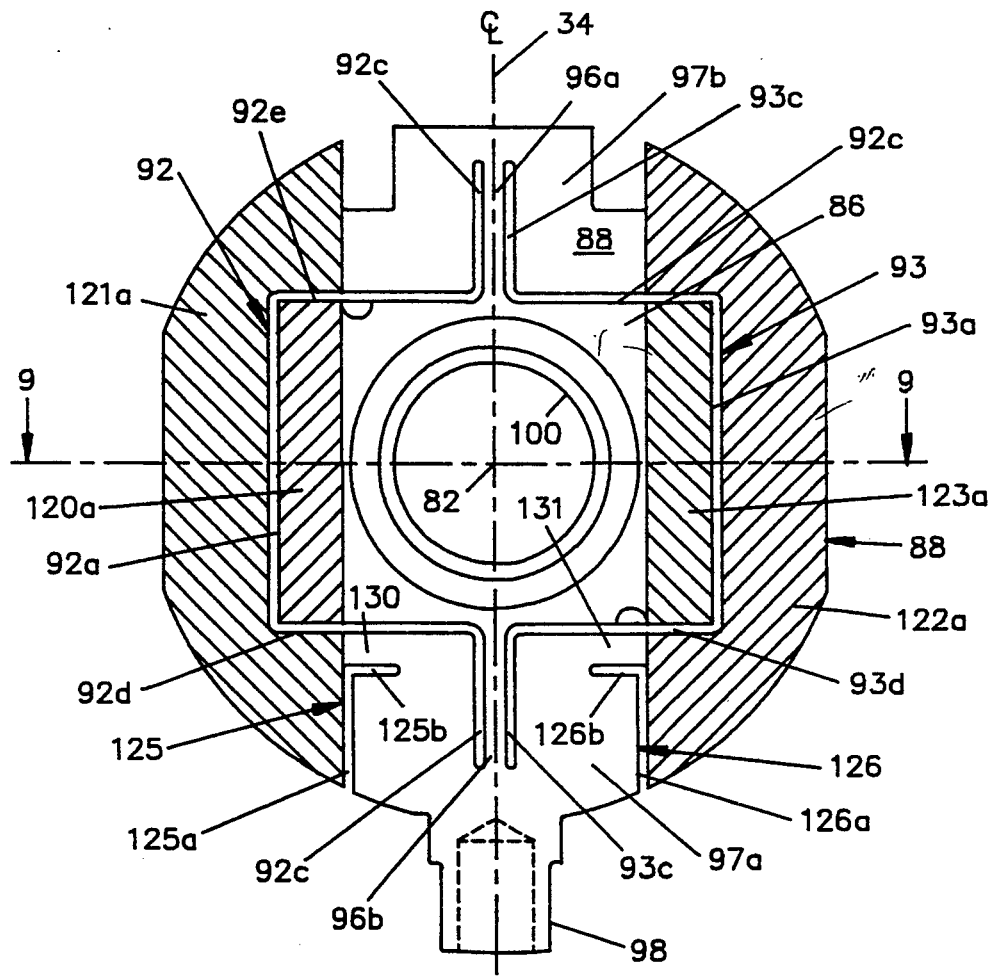
FIG. 8 is a view along line 8—8 of FIG. 7.
Figure 6:
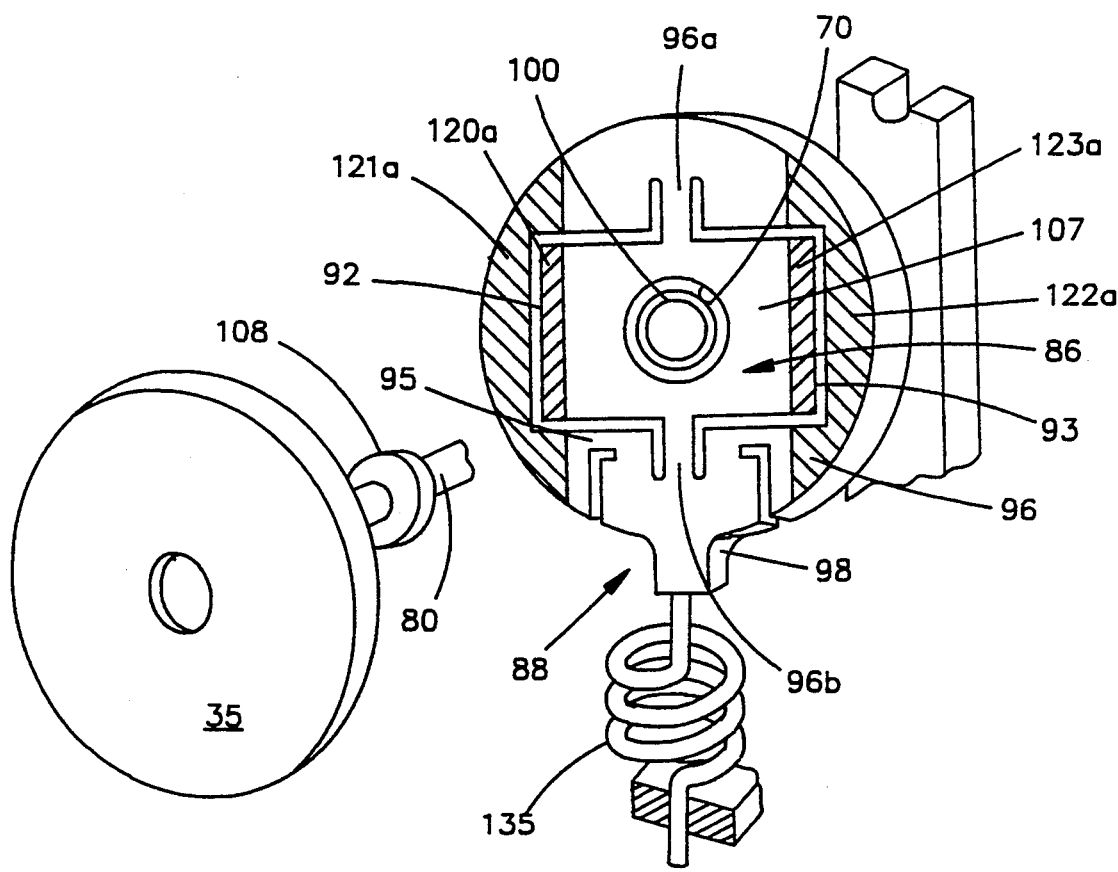
FIG. 6 is a schematic view in perspective of a structural relationship of the present invention.

As shown in FIG. 6 and FIG. 8, the second capacitor base member 88 is a cylindrically shaped metal plate member which has a first slot configuration of slot systems 92, 93 which are defined by spaced apart wall surfaces and which are tortuously located in the body of the second base member 88. The first slot configuration provides the fixed central plate section 86 which is connected by spaced apart torsion beam members or sections 96a, 96b to outer plate sections 97a, 97b (see FIG. 8). The beam members 96a, 96b are rectangular shaped in cross section with a narrow dimension in the plane of the drawing (FIG. 8) and a long dimension in a transverse plane. The beam members 96a, 96b are adapted to be torqued about a central vertical torque or displacement axis 34 where the torque or displacement axis 34 is located centrally of the beam members 96a, 96b and on a vertical median plane extending through the second base member 88. The displacement axis 34 also intersects and defines a vertical plane with the axis 82. The displacement axis 34 is parallel to the parallel planes in which the capacitor plates are located.

The central section 86 thus is a generally rectangularly shaped member defined between the slots systems 92 and 93 which are symmetrically arranged with respect to a central displacement axis 34. The outer section of the second base member 88 is attached by the torsion beam members 96a, 96b to the central section 86 along the central axis 34. Also along the central axis is a torque coupling element 98 (see FIG.8).

As shown in FIG.8, the slot system 92 has a central vertically walled portion 92a connected to parallel arranged walled end portions 92b and 92c by transversely arranged wall slot portions 92d and 92e. The slot 93 has similarly arranged portions 93a, 93b, 93c, 93d and 93e relative to the slot system 92. The spacing between the end portions 92b, 93b and 92c, 93c of the slots 92 and 93 define the narrow width dimension of the beam members 96a and 96b. The length of the slot portions 92b, 93b and 92c, 93c also defines the length of the beam members 96a and 96b.

Referring to FIG. 8, in the center of the central section 86 and the base member 88 is a mounting bore 100 which is centered on the axis 82. The bore 100 receives an annular outer tubular support ring 102 (see FIG. 7). The outer support ring 102 is welded about its periphery at its end surface to the central section 86. Disposed within the outer support ring 102 (see FIG. 8) is an annular inner tubular support member 106.

An inwardly facing planar surface 107 of the outer plate section of the second base member 88 is on the same vertical plane as the upper surface 108 of the center section 86. The facing surface 109 of the first base member 35 is parallel to the surface 107 of the second base member 88. Between the inner support member 106 on the second base member 88 and the first base member 35 is a disc shaped spacer member 110. The spacer member 110 effectively defines the capacitance gap for capacitor plates on the surfaces 107 and 109.

The rod 80 is threadedly attached to the support member 106 and extends through a centrally located opening on the first base member 35. A clamping means 112 threadedly attaches to the rod 80 so that the first and second base members 35 and 88 are assembled in a unitary assembly. A portion of the rod 80 extends outwardly of the support member 106 and is threadedly attached and welded to a balance mass 114. The balance mass 114 overcomes gravity effects when the device is in a horizontal position. The spacer member 110, the rod 80, the clamping means 80, and the support member 76 can be made from a material which is selected to have similar temperature expansion characteristics to the selected material for the base member 35. A metal material such as Invar is suitable. The base member 88 is made from a high strength material, such as a maraging stainless steel with good elastic characteristics for the torsion beam members. The steel base member 88 also will provide an electrical ground for the capacitor electrical system. By way of illustration, the coefficient of expansion for various materials averages (at room temperature) as follows:

| | |
|---|---|
| Super Invar | 0.2 parts/million/$o_F$ |
| Maraging | 6 parts/million/$o_F$ |
| Quartz | 0.3 parts/million/$o_F$ |

Figure 10:
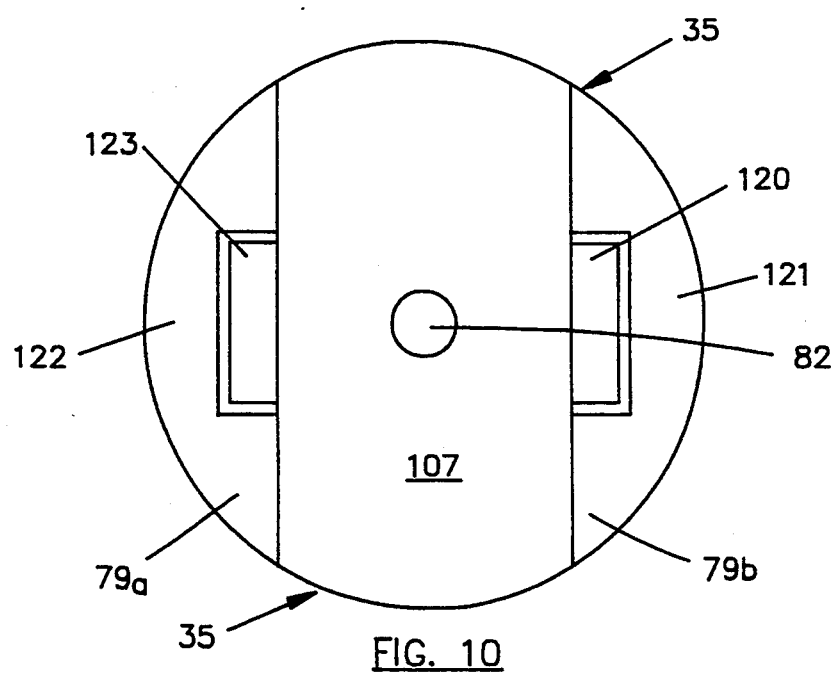
FIG. 10 is a plan view of the other of the base members.

Referring to FIG. 10, the first capacitor base member 35, as noted before, is made from a cylindrically shaped member preferably constructed from a quartz material and has independent capacitance plate films 120, 121, 122 and 123 (See FIG. 10) which are sputtered in separate locations onto a surface 109 of the base member 35. The capacitance plate films are arranged in spacial alignment with the planar surface 107 on the second capacitance base member 88. Separate electrical connections to each capacitor plate are made on the edge of the quartz plate. Electrical wire conductors are then connected to each capacitor film plate for separate capacitor measurements. On the surface 107, facing capacitance plate films 120a, 121a, 122a and 123a are located on an insulator base (See FIGS. 6 and 8) in a facing relationship to the films 120-123. If desired, the metal can be used as a ground surface in a grounded electrical capacitance system.

Figure 7:
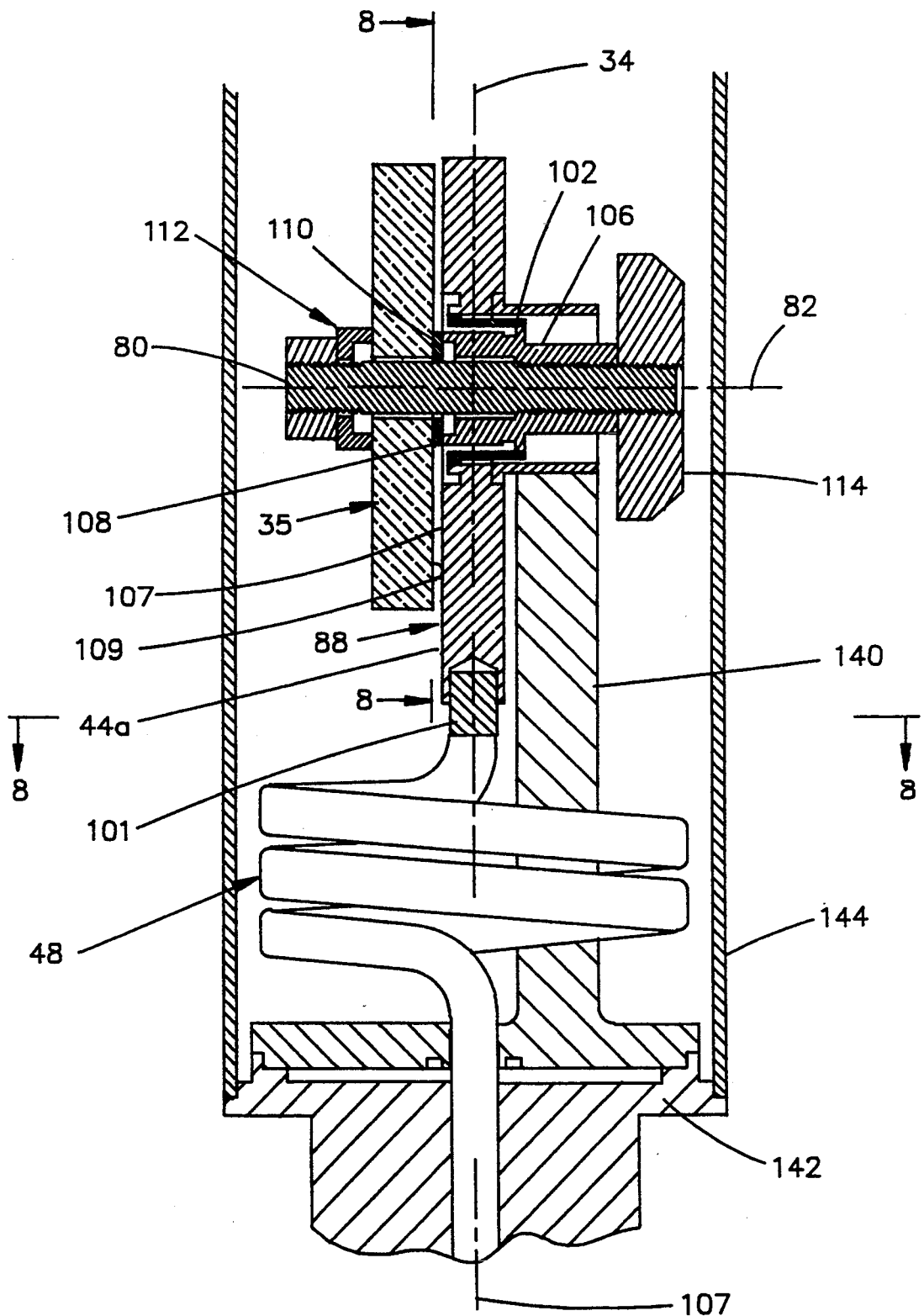
FIG. 7 is a view in longitudinal cross section through a vertical central axis of one form of the present invention.

As shown in FIG. 7, the planar surface 109 on the first base member 35 is arranged normally parallel to the planar surface 107 on the second capacitor base member 88 and is normally separated therefrom by a capacitor spacing distance or gap. The capacitance plate films which are offset from the central horizontal axis 82 (see FIG. 6) and from the vertical plane through the displacement axis 34 are similarly spaced parallel to the planar surface 107 on the base member 88. The widths of the capacitor gaps between the respective plate films and the surface 107 is basically defined by the width of the spacer member 110. It can thus be appreciated that the clamping means 112 on the fastener rod 80 attach the first capacitor base member 35 to the inner support ring 106 and, in turn, to the central section 86 of the second capacitor base member 88.

Referring again to FIGS. 6 and 8, the second capacitor base member 88 is also provided with a second vertical wall slot system comprised of angular "L" shaped slots 125 and 126 which are symmetrically arranged with respect to the axis 34. The sidewalls of the slot portion 125a of the sidewalls of slot 125 are parallel with the sidewalls of the slot portion 92a of the slot 92. The sidewalls of the slot portion 126a of the slot 126 are parallel with the sidewalls of the slot portion 93a of the slot 93. The sidewalls of the slot portions 125b and 126b of the slots 125,126 are aligned in horizontal planes with one another and are perpendicularly arranged relative to the displacement axis 34. It can be seen that the slot portions 125b and the slot portions 126b, respectively, define transverse beam portions 130,131 about an axis perpendicular to the displacement axis 34. The purpose of this arrangement is to minimize temperature effects by providing an equal and accurately controlled heat conduction path to each capacitance side.

The torquing of the beam members 96a,96b on the central section 86 of the base member 88 is accomplished by a spirally wound bourdon tube 135 (FIG. 6). The bourdon tube develops a torque force about the axis 34 which is a function of pressure in the bourdon tube.

The assembly of the base members 35 and 88 is supported on a vertical support member 140. The support member 140 is attached to a cylindrically shaped base member 142. In practice, a metal cylindrical enclosure housing 144 encloses the capacitance and bellows at a vacuum or contains inert gas.

One of the features of the present invention is the arrangement which enables use of micro-elastic characteristics of metals. By way of definition, the macro yield point of a metal can be defined as the point where the metal has a set or plastic strain (permanent deformation) of 0.2% or two parts per thousand. The micro yield point of a metal is defined as the point where the metal has a set in a range of 0.01% to 0.0001% or one part per ten thousand to one part per million. The capacitor transducer utilizes a relatively small deflection so that the primary determining element is the torque beams which have very low stress levels. The bourdon tube operates in an essentially constrained mode as a pressure to force converter. Additionally since the stress levels in the torsion beam members are in the micro-elastic range, the elastic characteristics of the torsion beams can approach nearly ideal performance. Ideal performance is approached by the diminishing effect of hysteresis creep, and non-linear response as stress levels are reduced.

The stress levels in obtaining micro-elastic characteristics are low because the deflection required for the capacitor sensor can be small, for example 0.001 radian. The beam members providing the displacement axis are stiff or rigid and the torque force applied is low, for example 0.3 inch pounds.

By way of example, the diameter of the base member 35 is about 0.850 inches. The diameter of the base member 88 is about 0.900 inches and 0.125 inches thick. The width of the slots is about 0.020 inches. The spacer 110 is 0.001 inches thick.

While the preferred embodiment is to exploit micro yield characteristics to produce accuracy and repeatability, macro yield materials may be suitable for some applications.

Temperature can also affect the capacitance structure. The top base member of the capacitor is preferably a low expansion material which is dimensional stable, such as quartz. The lower capacitance member is preferably made of the same material as the torque beam to avoid welds.

The two capacitance plates are respectively mounted by aligned connections to a base member which, in turn, is attached to another mass. Since the structure is mounted in a vacuum, temperature change of the capacitance plates is affected primarily by thermal conduction through the mountings.

It will be apparent to those skilled in the art that various changes may be made in the invention without departing from the spirit and scope thereof and therefore the invention is not limited by that which is enclosed in the drawings and specifications but only as indicated in the appended claims.

I claim:

1. A capacitor device for utilizing dependent capacitances for measurement purposes comprising:

a first capacitor base member and a second capacitance base member arranged with facing surfaces; said facing surfaces having capacitor surface area defining four capacitors where a first pair of said capacitors are located on opposite sides relative to a transverse central plane to define measurement capacitors and where a second pair of said capacitors are located on opposite sides relative to the transverse plane to define reference capacitors;

said second capacitor base member having a center section connected to an outer peripheral section of said second capacitor base member by torsion beam means, said measurement capacitors being located on said outer section and said reference capacitors being located on said center section; said centrally located center section also being fixed relative to said first capacitor base member by attachment means;

said torsion beam means having a displacement axis related to said facing surfaces so that angular displacement of said outer section of said second capacitor base member relative to said center section about said displacement axis produces a dependant capacitance change in said measurement capacitors;

force means coupled to said outer section of said second capacitor base member for producing a torsion force on said torsion beam means for developing angular displacement of said outer section and a capacitance change in said measurement capacitors as a function of said torsion force where said capacitance change is independent from the capacitance of said reference capacitors.

2. The apparatus as set forth in claim 1 wherein said facing surfaces have a parallel relationship.

3. The apparatus as set forth in claim 1 wherein the capacitors are constructed and arranged to equalize capacitance measurements of said capacitors at a null condition.

4. The apparatus as set forth in claim 1 and further including processing means for sequentially supplying capacitance measurements from the capacitors to a single channel converter for deriving capacitance signals representative of each of the capacitance measurements.

5. The apparatus as set forth in claim 4 and further including means for combining said capacitance signals from said single channel converter for deriving processed signals from the combined capacitance signals where the processed signals are compensated for deviation of the reference capacitors from a null position.

6. The apparatus as set forth in claim 4 wherein capacitance measurements from the reference capacitors are used to correct the capacitance measurements from the measurement capacitors in the means for combining according to the following relationship:

$$\alpha_{B1} = \frac{C_1 - C_2}{C_1 + C_2} - K_A \frac{C_3 - C_4}{C_3 + C_4}$$

where $\alpha_{B1}$ is the angular deflection of the center section, $C_1$ and $C_2$ are measurements capacitance values, $C_3$ and $C_4$ are reference capacitance values and $K_A$ is a proportionality constant.

7. The apparatus as set forth in claim 5 wherein the capacitance measurements from the reference capacitors are used to correct the capacitance measurements from the measurements capacitors in the means for combining according to the following relationship:

$$G = K_G \cdot \frac{C_3 + C_4}{2 C_3 C_4}$$

where G is the undeflected Gap spacing, $K_G$ is a proportionality constant and $C_3$ and $C_4$ are reference capacitance values.

8. The apparatus as set forth in claim 5 wherein the capacitance measurements from the reference capacitors are used to correct the capacitance measurements from the measurements capacitors in the means for combining according to the following relationship:

$$\alpha_{B1} = \left[ \frac{C_1 - C_2}{C_1 + C_2} - K_A \cdot \frac{C_3 - C_4}{C_3 + C_4} \right] \frac{C_3 + C_4}{2 C_3 C_4} \cdot K_G$$

where $\alpha_{B1}$ is the angular deflection of the center section, $C_1$ and $C_2$ are measurement capacitance values, $C_3$ and $C_4$ are reference capacitance values, and $K_A$ and $K_G$ are proportionality constants.

9. The apparatus as set forth in claim 5 wherein the single channel converter develops frequency signals as a function of a capacitance measurement and wherein the capacitance measurements from the reference capacitors are used to correct the capacitance measurements from the measurement capacitors in the means for combing according to the following relationship:

$$\alpha_{B1} = \frac{\frac{f_1}{K_G} - \frac{f_2}{K_f}}{\frac{f}{K_f} + \frac{f_2}{K_f}} - K_A \cdot \frac{\frac{f_3}{K_f} - \frac{f_4}{K_f}}{\frac{f_3}{K_f} + \frac{f_4}{K}}$$

$\alpha_{B1}$ is the angular deflection of the central section, $f_1$ and $f_2$ are the frequency signals from the measurement capacitors, $f_3$ and $f_4$ are the frequency signals from the reference capacitors and $K_f$ is the conversion factor for the single channel converter.

10. The apparatus as set forth in claim 5 wherein the single channel converter develops frequency signals as a function of a capacitance measurement and wherein the capacitance measurements from the reference capacitors are used to correct the capacitance measurements from the measurements capacitors in the means for combing according to the following relationship:

$$G = K_G K_f \frac{f_3 + f_4}{2 f_3 f_4}$$

where $\alpha_{B1}$ is the angular deflection of the central section, $f_3$ and $f_4$ are the frequency signals from the the reference capacitors $K_G$ is a proportionality constant and $K_f$ is the conversion factor for the single channel converter.

11. The capacitor device as set forth in claim 1 wherein the torsion beam means has a rectangular cross section with long and short dimensions relative to said displacement axis, and where the surfaces of said torsion beam beams are parallel to said displacement axis and wherein said long dimension is normal to the planes of said capacitor surfaces.

12. The capacitor device as set forth in claim 11 wherein the torsion beam means are constructed from a high strength metal material having good elastic characteristics and wherein said force means develops a torsion force which does not exceed the micro yield point of the torsion beam means.

13. The capacitor device as set forth in claim 11 wherein the torsion beam means are constructed from a high strength metal material having good elastic characteristics with a macro yield point above the working stress levels in said torsion beam means.

14. The capacitor device as set forth in claim 11 wherein the torsion beam means are constructed from a material having good elastic characteristics with a micro yield point above the working stress levels of the torsion beam means.

15. The capacitor device as set forth in claim 11 wherein the torsion beam means are constructed from a high strength metal material having good elastic characteristics in the stress range of the torsion means.

16. A capacitor device for utilizing dependent capacitances for measurement purposes comprising:

a first capacitor base member and a second capacitance base member arranged with parallel surfaces in parallel planes; said parallel surfaces having facing capacitor surfaces defining four capacitors where a first pair of said capacitors surface are located on opposite sides relative to a transverse central plane to define measurement capacitors and where a second pair of said capacitors are located on opposite sides relative to the transverse plane to define reference capacitors;

said second capacitor base member having a centrally located center section connected to an outer peripheral section of said second capacitor base member by torsion beam means, said measurement capacitors being located on said outer section and said reference capacitors being located on said center section; said centrally located center section also being attached to said first capacitor base member by attachment means;

said torsion beam means having a displacement axis parallel to said parallel surfaces so that angular displacement of said outer section of said second capacitor base member relative to said center section about said displacement axis produces a dependant capacitance change in said measurement capacitors;

force means coupled to said outer section of said second capacitor base member for producing a torsion force on said torsion beam means for developing angular displacement of said outer section and a capacitance change in said measurement capacitors as a function of said torsion force where said capacitance change is independent from the capacitance of said reference capacitors;

17. The apparatus as set forth in claim 16 wherein the capacitors are constructed and arranged to equalize capacitance measurements of said capacitors at a null condition.

18. A method of measuring capacitance in a capacitor device utilizing dependent capacitances for measurement purposes and wherein the capacitor device has a first capacitor base member and a second capacitance base member arranged with facing capacitor surfaces where said facing capacitor surfaces define four capacitors and where a first pair of capacitors are located on opposite sides relative to a central transverse plane and where a second pair of capacitors are located on opposite sides relative to the transverse plane to define reference capacitors, the method comprising the steps of:

applying a torque force to a torsion beam means on one of said capacitance base members for displacing said measurement capacitors angularly relative to one another;

measuring the capacitances of the reference capacitors and the measurement capacitors;

sequentially processing the measurements of said capacitances through a single channel converter for developing signals representative of the measurement capacitors and of the reference capacitors as a function of the measurements of the capacitances; and combining the signals from the measurement capacitors with the signals from the reference capacitors for correcting the measurement signals if the reference capacitors deviate from a null condition.

* * * * *